(12) United States Patent
Wang

(10) Patent No.: US 8,503,401 B2
(45) Date of Patent: Aug. 6, 2013

(54) HANDOVER METHOD AND USER EQUIPMENT

(75) Inventor: Yonggang Wang, Shanghai (CN)

(73) Assignee: Alcatel Lucent, Paris (FR)

( * ) Notice: Subject to any disclaimer, the term of this patent is extended or adjusted under 35 U.S.C. 154(b) by 510 days.

(21) Appl. No.: 12/673,024

(22) PCT Filed: Jul. 21, 2008

(86) PCT No.: PCT/CN2008/001344
§ 371 (c)(1),
(2), (4) Date: Feb. 11, 2010

(87) PCT Pub. No.: WO2009/024013
PCT Pub. Date: Feb. 26, 2009

(65) Prior Publication Data
US 2012/0014264 A1    Jan. 19, 2012

(30) Foreign Application Priority Data
Aug. 15, 2007   (CN) .......................... 2007 1 0045026

(51) Int. Cl.
*H04W 4/00*       (2009.01)
*H04W 36/00*      (2009.01)

(52) U.S. Cl.
USPC ............ 370/332; 370/331; 455/436; 455/444

(58) Field of Classification Search
USPC ............................. 370/331–334; 455/436–444
See application file for complete search history.

(56) References Cited

U.S. PATENT DOCUMENTS
2004/0202140 A1*  10/2004  Kim et al. ..................... 370/335
2006/0039344 A1    2/2006  Khan
2008/0287129 A1*  11/2008  Somasundaram et al. .... 455/436
2008/0311926 A1*  12/2008  Fischer et al. ............. 455/452.1
2009/0156225 A1*   6/2009  Angelow et al. ............. 455/450

FOREIGN PATENT DOCUMENTS
| CN | 1738233 A | 2/2006 |
| EP | 1626534 A1 | 2/2006 |
| WO | 2005067492 A2 | 7/2005 |

OTHER PUBLICATIONS

International Search Report.
PCT Patent Application No. PCT/CN2008/001344, Written Opinion of the International Searching Authority, mailed Nov. 6, 2008, 4 pages.
English Bibliograph for Chinese Patent Application Publication No. CN1738233, filed Aug. 19, 2005, printed from Thompson Innovation on Aug. 29, 2012, 3 pages.

* cited by examiner

*Primary Examiner* — Paul H Masur
(74) *Attorney, Agent, or Firm* — Fay Sharpe LLP

(57) ABSTRACT

A method and user equipment for performing a handover between a MBSFN and non-MBSFN areas in a communication network is provided. The communication network comprises a first cell constituting a MBSFN area, a second cell constituting the non-MBSFN area, and a reserved cell between the first and second cells and subordinate to the MBSFN area. Reserved cell indication information being broadcast in the reserved cell. The method including: receiving the reserved cell indication information to learn that a user equipment is located in the reserved cell; measuring in the reserved cell, for a preset service, a first signal strength based on MBMS transmission and a second signal strength based on a single-cell transmission; and selecting the first or second cells as a target cell during a period in which a difference between the first and second signal strengths is lower than a preset threshold.

20 Claims, 3 Drawing Sheets

HANDOVER METHOD AND USER EQUIPMENT

BACKGROUND OF THE INVENTION

1. Field of the Invention

The present invention relates to handover of user equipment between different communication areas, and particularly to a method for performing a handover between MBSFN and non-MBSFN areas as well as user equipment therefor, which can provide continuous MBMS service when the user equipment moves between different communication areas.

2. Description of Prior Art

The 3GPP launched the 3G LTE (Long Term Evolution) in 2005 in which evolved access technologies, such as E-UTRA, and evolved access networks, such as E-UTRAN, are utilized to provide better support for carriers and users' increasing requirements. In the LTE, it is clearly advanced that the evolved MBMS (Multimedia Broadcast Multicast Service) services (E-MBMS) shall be supported. MBMS is a service introduced in 3GPP Release 6 and refers to a point-to-multipoint wireless communication service for transmitting data from one data source to a plurality of users, so as to achieve an evolution of network resource including a core network and an access network while serving as many multimedia users with the same requirements as possible by using as little resources as possible. The introduction of MBMS adds three logic channels into the standard, i.e. a MCCH (MBMS control channel), a MTCH (MBMS traffic channel) and a MSCH (MBMS scheduling channel). The MCCH channel always exists in a cell since it is required to timely notify UEs of control information related to MBMS service.

As an evolved technology from the MBMS, one of the most important features of E-MBMS lies in that its service data are combined using MBSFN (MBMS Single Frequency Network) in an air structure. That is, for the same service, data transmitted from difference base stations are designed to transmit the same content at the same time. In this way, a UE may receive, over the air interface, a natural superposition of physical signals having the same content from a plurality of base stations, which leads to a multiplied reception SNR (Signal-to-Noise). Such a set of cells that can implement MBSFN transmission is called a MBSFN area. In order to implement MBSFN transmission of service data, many forms may be adopted for respective service data in the access network. A single-cell transmission mode is adopted in the access network for services not participating in the MBSFN transmission.

Further, RAN2#58 has already proposed that the transmission of MBMS service in E-UTRAN may be either a single-cell transmission or a multi-cell (MBSFN) transmission. As stated in the above, the multi-cell transmission is characterized by simultaneous transmission of MBMS service from multiple cells within a MBSFN Area and support to combination of MBMS transmissions from multiple cells. On the contrary, the single-cell transmission is characterized in that MBMS service is transmitted only within the coverage of a specific cell and combination of MBMS transmissions from multiple cells is not supported. Therefore, when UE moves, especially between MBSFN and non-MBSFN areas, the UE is required to perform a handover and a transmission mode switching operation so as to provide continuous MBMS service.

SUMMARY OF THE INVENTION

The present invention is made in view of the above problems. An object of the present invention is to provide a method for performing a handover between MBSFN and non-MBSFN areas and user equipment therefor, which can provide continuous MBMS service for the user when the user equipment moves between difference communication areas.

In an aspect of the present invention, a handover method applied in a communication network is provided. The communication network comprises a first cell constituting a MBSFN area, a second cell not constituting the MBSFN area, and a reserved cell between the first cell and the second cell being subordinate to the MBSFN area, wherein reserved cell indication information is broadcast in the reserved cell. The method comprises steps of: receiving the reserved cell indication information to learn that a user equipment is located in the reserved cell; measuring in the reserved cell, for a preset service, a first signal strength based on MBSFN transmission and a second signal strength based on single-cell transmission; and selecting the first cell or the second cell as a target cell when a difference between the first signal strength and the second signal strength is lower than a preset threshold.

According to an embodiment of the present invention, the MBSFN transmission and the single-cell transmission are multiplexed on the same carrier.

According to an embodiment of the present invention, each of the MBSFN transmission and the single-cell transmission are placed on a respective carrier. The step of measuring comprises: measuring signal strength on the current carrier, and measuring signal strength on another carrier during a preset time period.

According to an embodiment of the present invention, the signal strength may be the signal strength of a service channel. Alternatively, it may be the signal strength of a reference signal on a service channel.

According to an embodiment of the present invention, the handover method further comprises a step of selecting data of the MBSFN transmission and the single-cell transmission based on PDCH SN of PDCH for the preset service for a period when the first signal strength and the second signal strength are balanced with each other.

According to an embodiment of the present invention, one of the first and second cells, which has higher signal strength, is selected as the target cell.

According to an embodiment of the present invention, the reserved cell indication information is broadcast over a MCCH.

In a further aspect of the present invention, a mobile device applied in a communication network is provided. The communication network comprises a first cell constituting a MBSFN area, a second cell not constituting the MBSFN area, and a reserved cell between the first cell and the second cell being subordinate to the MBSFN area, wherein reserved cell indication information is broadcast in the reserved cell. The mobile device comprises: transceiver means adapted to receive the reserved cell indication information to learn that a user equipment is located in the reserved cell; measurement means adapted to measure in the reserved cell, for a preset service, a first signal strength based on MBSFN transmission and a second signal strength based on single-cell transmission. The first cell or the second cell is selected as a target cell when a difference between the first signal strength and the second signal strength is lower than a preset threshold.

With the method and device of the present invention, a user may be provided with continuous MBMS service when his or her user equipment moves between MBSFN and non-MBSFN areas. In addition, since the user equipment performs cell selection only after entering completely the coverage area of a target base station, a seamless handover can be achieved. Moreover, during the handover, data of the MBSFN transmission and data of the single-cell transmission are combined through PDCP SN, thereby achieving a lossless transmission of MBMS service data.

BRIEF DESCRIPTION OF THE DRAWINGS

The above features and advantages of the present invention will be apparent from the following detailed description in conjunction with the drawings, in which.

DETAILED DESCRIPTION OF THE PREFERRED EMBODIMENTS

Figure 1:
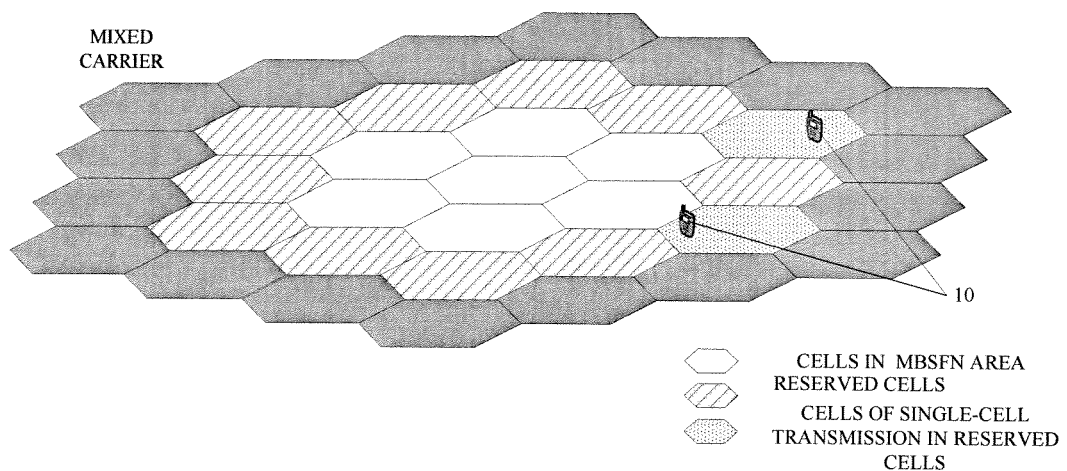
FIG. 1 shows a schematic diagram of a network environment in which a method and device according to a first embodiment of the present invention are applied.

In the following, a detailed description will be given to embodiments of the present invention with reference to the drawings. In the drawings, same reference numerals are used to indicate same or similar components throughout different drawings. For sake of clarity and simplicity, detailed descriptions to known functions and structures included here will be omitted, which otherwise will obscure the subject matter of the present invention.

First Embodiment

FIG. 1 shows a schematic diagram of a network environment, in which a method and device according to a first embodiment of the present invention are applied.

As shown in FIG. 1, according to the first embodiment of the present invention, MBMS service and unicast service are multiplexed on the same carrier. In other words, both of the MBMS service and the unicast service may be transmitted on the carrier.

Generally, cells propagating the same MBMS service constitute a MBSFN, and certain service for a user is simultaneously transmitted in the respective cells within the MBSFN. Therefore, in the MBSFN, a physical superposition of signals for the same service may allow a user equipment 10 to receive signals in the MBSFN area without any handover operation.

As shown in FIG. 1, a circle of reserved cells is arranged at the outer boundary of the MBSFN area, in order to prevent interference of transmitted signals from cells in other non-MBSFN areas. In a reserved cell, a base station broadcasts reserved cell indication information on the MCCH channel of the cell, to notify a user entering the cell that this cell is a reserved cell, i.e. it is near a border between MBSFN and non-MBSFN areas.

Further, in the reserved cell, the base station transmits both of MBMS service data and unicast service data on a carrier. In this way, for some service such as mobile TV program, a handover may be implemented in the reserved cell during the process of the user equipment being moving from the MBSFN area to the non-MBSFN area, without incurring any discontinuity of the mobile TV program.

Figure 2:
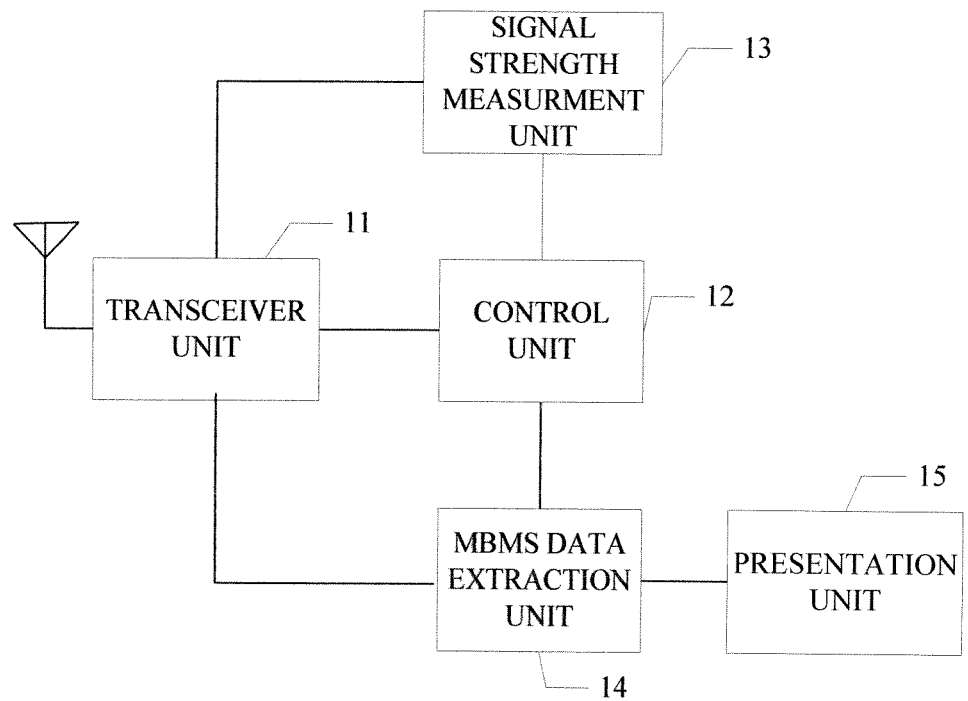
FIG. 2 shows a block diagram of a user equipment according to the first embodiment of the present invention.

FIG. 2 shows a block diagram of the user equipment according to the first embodiment of the present invention. As shown in FIG. 2, the user equipment according to the first embodiment of the present invention comprises: a transceiver unit 11 adapted to receive a service signal desired by a user from a carrier carrying MBMS and unicast services; a control unit 12; a signal strength measurement unit 13 adapted to measure strengths of two different signals for the same service, which are received by the transceiver unit 11, under control of the control unit 12, which then compares the strengths of the received signals with a preset threshold and performs a cell selection, i.e. a handover, based on the comparison result; a MBMS data extraction unit 14 adapted to select service data from difference cells during the time period of handover and to combine these data according to PDCP SN; and a presentation unit 15 adapted to process the MBMS service data obtained by the MBMS data extraction unit 14 and present the processed data to the user.

As mentioned above, when the user equipment 10 enters a reserved cell from a MBMS transmission cell, the control unit 12, after the reserved cell indication information is received on the reserved cell's MCCH channel by the transceiver unit 11, instructs the transceiver unit 11 to immediately read information on the overall MCCH for both of the MBSFN area and the single-cell transmission area.

If the reserved cell also transmits the service, such as mobile TV program, in a single-cell transmission mode at the same time, the control unit 12 may perform a handover at an appropriate timing based on the strengths of the two signals for the same service. Here, the signal strength may be signal strength on a service channel, or strength of a reference signal on a service channel.

For example, the control unit 12 instructs the signal strength measurement unit 13 to measure different signal strengths for the same service on the carrier, and judges whether an absolute value of a difference between the two signal strengths is lower than a preset threshold. For a time period when the above threshold is satisfied, the transceiver unit 11 receives not only a service signal from multi-cell transmission but also a service signal from single-cell transmission. When the strengths of these two signals reach a balance, the control unit 12 instructs the transceiver unit 11 to perform a cell selection, i.e. to select a cell with higher signal strength.

Since the handover is performed when the signal strength of the single-cell transmission is higher than that of the multi-cell transmission, a seamless handover can be ensured. However, if the cell does not transmit the service, the control unit 12 establishes a RRC connection with the base station on the carrier via the transceiver unit 11 so as to trigger single-cell MBMS transmission for the service, while not performing a handover immediately. The subsequent process is consistent with the handover process mentioned above.

It is possible that the user equipment 10 may return to the MBSFN transmission area, without triggering the RRC connection to terminate the MBMS single-cell transmission. In this case, the base station or the network may perform a periodic polling to judge whether a user equipment exists in the reserved cell and further terminate the MBMS single-cell transmission.

Figure 3:
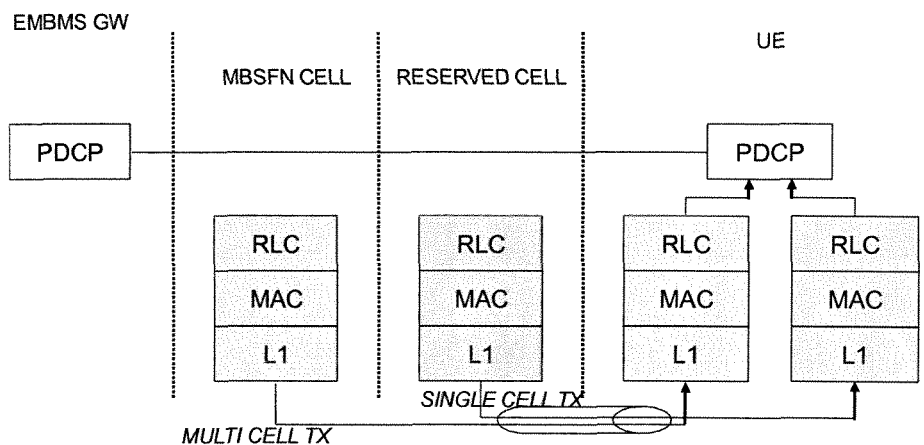
FIG. 3 shows a schematic diagram of an operating procedure of a MBMS data extraction unit as shown in FIG. 2.

Since the user equipment may receive a MBMS signal and a single-cell signal simultaneously, such an optimized handover mechanism can achieve lossless mobility for the UE. As shown in FIG. 3, a PDCP (Packet Data Convergence Protocol) layer is a community layer in E-MBMS GW (Gateway), and the MBSFN cell and the single cell transmit the same PDCP SDU (Service Data Unit). Therefore, the MBMS data extraction unit 14 of the UE 10 may perform a selective combination to provide MBMS services in a variety of conditions without any packet transmission loss, when the mobile TV program is sent out in the form of PDCP based on its PDCP SN (Serial Number).

As shown in FIG. 3, a PDCP SDU for certain service is transmitted from the E-MBMS GW. Since the MBSFN area (multi-cell transmission) and the reserved cells (single-cell transmission) are transparent to the UE, the MBMS data extraction unit 14 selectively combines, at the PDCP layer of the UE 10, the PDCP data based on the PDCP SN for the service to form a data stream for the mobile TV program. Furthermore, the presentation unit 15 processes the obtained data stream and present it to the user.

A handover procedure from a reserved cell to a MBSFN area will be described in the following. As mentioned above, a mixed cell, namely a MBMS reserved cell, broadcasts on the MCCH not only its own control information but also configuration information of multi-cell transmission in MBSFN. Once the UE 10 enters the reserved cell from a unicast cell, the UE 10 can receive both the control information of the single-cell transmission and the control information of the multi-cell transmission. Then, the UE 10 may continue receiving services from the two radio signal sources, and combine the received packets based on PDCP. This procedure is similar to that depicted above, except a difference of the switching from the single-cell transmission to the multi-cell transmission, i.e. transmission in the MBSFN area.

Figure 4:
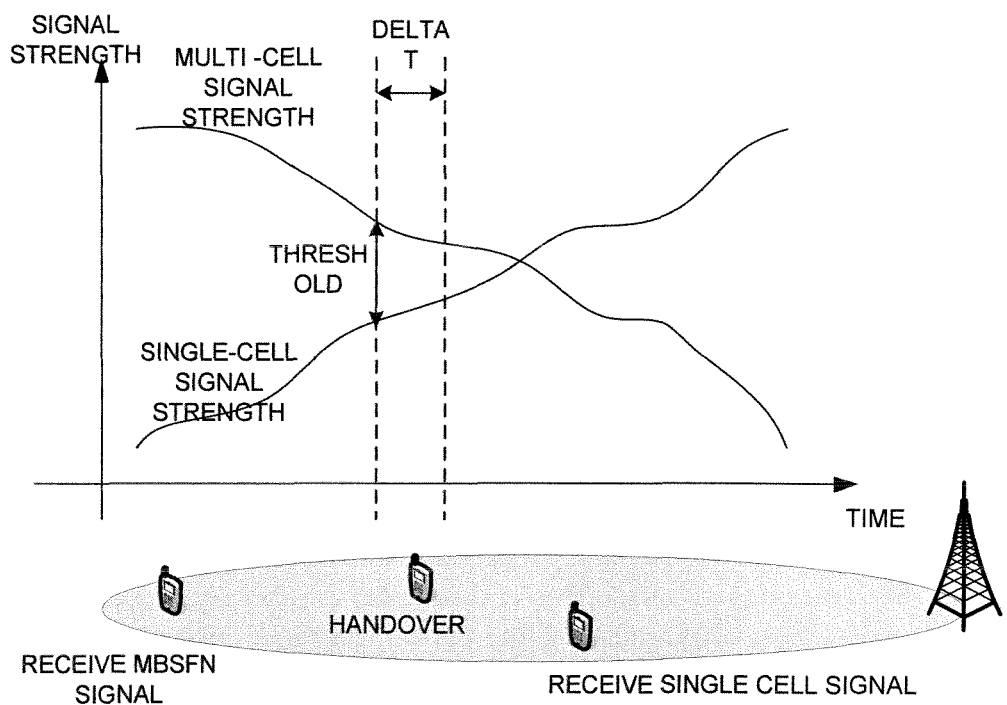
FIG. 4 shows a schematic diagram of a procedure for performing the handover method according to the first embodiment of the present invention.

FIG. 4 shows a schematic diagram of a process of performing the handover method according to the first embodiment of the present invention. As shown in FIG. 4, on the border near a transmitting cell of the MBSFN area, the UE 10 can receive a signal leaking from the MBSFN area and does not need an immediate handover, though the single-cell transmission is on going. Therefore, a handover can be performed after the UE 10 has entered the reserved cell for a long distance, for example, ¾ of the radius of the cell as shown in FIG. 3. Alternatively, the control unit 12 instructs the transceiver unit 11 to select a cell of higher signal strength to implement the handover during a period when a difference between two signal strengths measured by the signal measurement unit 13 of the UE 10 is lower than a preset threshold. However, during the period, as mentioned above, the MBMS data extraction unit 14 selects signals from two radio signal sources, extracts PDCP data for the mobile TV program and then combines the PDCP data.

The reason for performing the handover during the above period is that the power of the service signal has no substantial variance before and after the handover, or is lower than a preset threshold. This can ensure continuity of the MBMS service provided for the users.

Second Embodiment

The first embodiment as illustrated above is directed to the case in which the MBMS service and the unicast service are multiplexed on the same carrier. However, the MBMS service may have a dedicated carrier, that is, the MBMS service may be transmitted on a dedicated carrier. On the other hand, the unicast services or other services (such as MBMS single-cell transmission) are multiplexed on another carrier.

Figure 5:
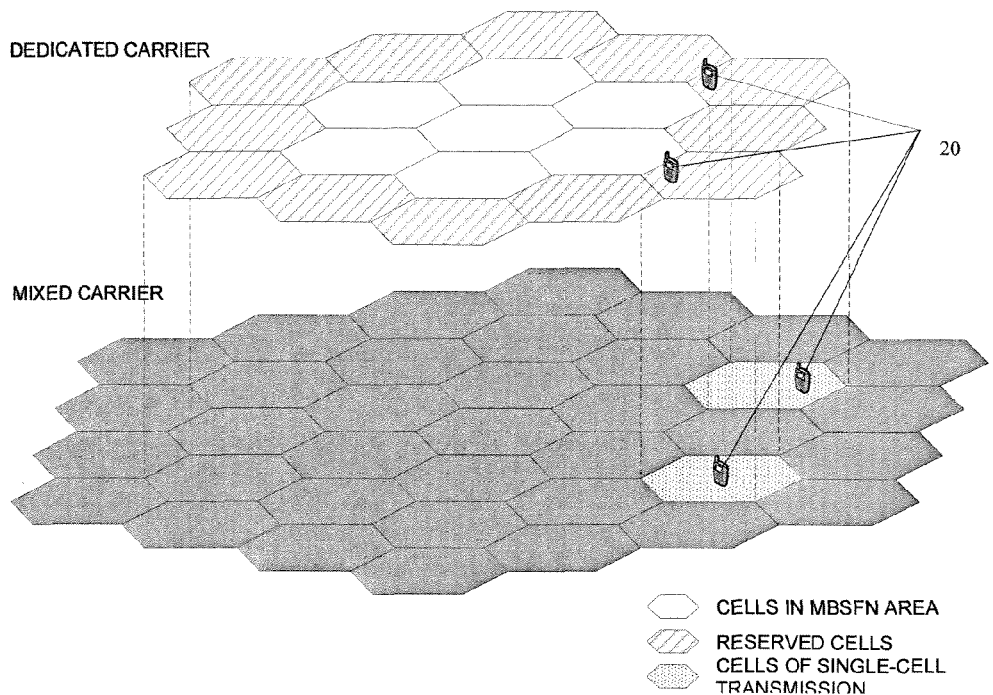
FIG. 5 shows a schematic diagram of a network environment, in which a handover method and device according to a second embodiment of the present invention are applied.

FIG. 5 shows a schematic diagram of a network environment where the method and apparatus according to the second embodiment of the present invention are applied. As shown in FIG. 5, MBMS service in the MBSFN area are transmitted on a dedicated carrier, and other services are transmitted on another carrier. This thus constitutes a hierarchical network structure. As shown in FIG. 5, cells in the MBSFN area use the dedicated carrier to transmit a MBMS service, such as a mobile TV to program. Meanwhile, the mobile TV program can be also transmitted on the another carrier, where a single-cell manner is adopted but with different coverage. Therefore, the cellular network seems hierarchical to the UE 20. The cellular network may receive the mobile TV program not only in the MBSFN area but also in the single-cell transmission area. Since there are two different carriers, the UE 20 is required to perform a handover based on an inter-frequency measurement.

A handover between a dedicated carrier and a mixed carrier requires the UE 20 to perform an inter-frequency measurement in a DRX (Discontinuous Reception) or in a corresponding slot. In addition, reserved cell indication information is broadcast on the reserved cell's MCCH to notify the UE 20 that the cell where it is located is a reserved cell. Upon entering the reserved cell, the UE 20 reads the information on the MCCH. This is helpful for the UE to trigger an inter-frequency measurement for the target cell, and also to trigger itself and the network to prepare for a MBMS service handover. As a result, the period of the UE's service discontinuity is reduced.

Figure 6:
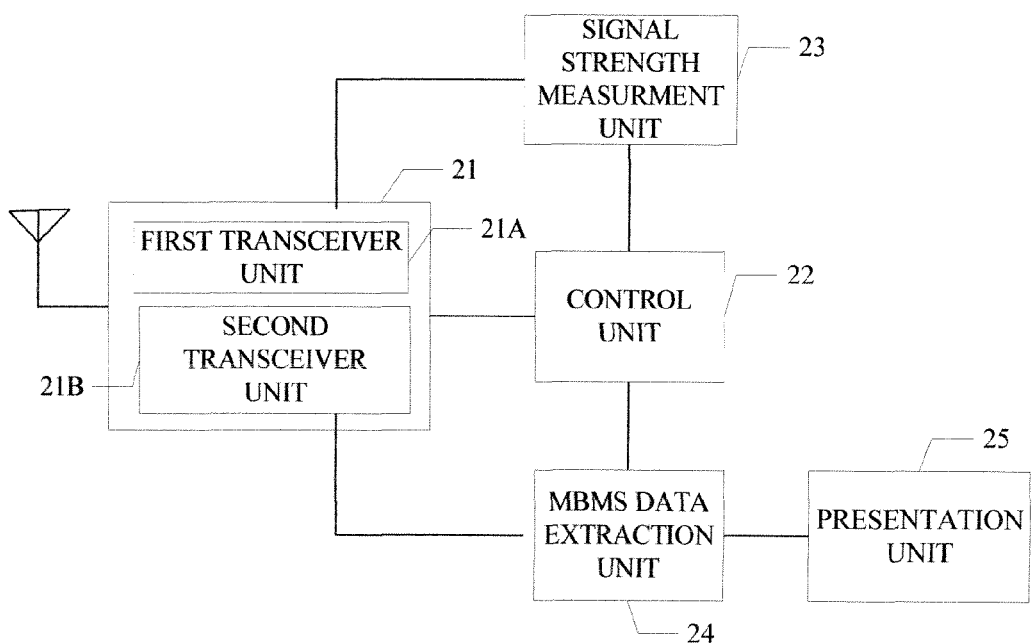
FIG. 6 shows a block diagram of user equipment according to the second embodiment of the present invention.

FIG. 6 shows a block diagram of the user equipment according to the second embodiment of the present invention. As shown in FIG. 6, the UE according to the second embodiment of the present invention comprises: a transceiver unit 21 comprising a first transceiver unit 21A adapted to receive a signal on a dedicated carrier and a second transceiver unit 21B adapted to receive a signal on another carrier; a control unit 22; a signal strength measurement unit 23 adapted to measure a signal strength on the current carrier under control of the control unit 22, and to measure a signal strength on another carrier during the DRX, wherein the control unit compares strengths of the received two signals with a preset threshold and performs a cell selection, i.e. a handover, based on the comparison result; a MBMS data extraction unit 24 adapted to select service data from difference cells before and after the handover, and to perform combination of the data based on PDCP SN; and a presentation unit 25 adapted to process MBMS service data obtained by the MBMS data extraction unit 24 and to present the processed data to the user.

When UE 20 enters a reserved cell from a MBMS transmitting cell, the control unit 22, after the reserved cell indication information is received on the MCCH, triggers an inter-frequency measurement action, and the signal strength measurement unit 23 measures signal strengths on both the current carrier and the another carrier. Then, the control unit 22 compares the inter-frequency measurement results for both the serving cell and a neighboring cell, to determine a cell having a better reception condition. The UE 20 may automatically receive the MCCH in the neighboring cell during the inter-frequency measurement. If the neighboring cell is transmitting the service, the UE can perform a cell selection at an appropriate timing. For example, a handover is performed after a preset period in which the single-cell signal strength keeps higher than the multi-cell signal strength. However, if the cell does not transmit the service, the control unit 22 establishes a RRC connection in a mixed carrier via the second transceiver unit 21B so as to trigger the MBMS transmission. This is because there is no uplink in the dedicated carrier.

A handover procedure inverse to the above is described in the following. When UE 20 enters a mixed cell whose coverage overlaps that of a cell in a MBSFN area, the base station broadcasts, on the mixed cell's MCCH, not only its own control information, but also the carrier frequency and MCCH configuration information of a target cell in MBSFN. The first transceiver unit 21A of the UE 20 detects the MCCH in the target cell, the signal strength measurement unit 23 measures the signal strength on the dedicated channel, and then the control unit 22 compares the signal strength with a preset threshold, so as to perform a cell selection, i.e. a handover.

The foregoing description gives only the embodiments for implementing the present invention. It shall be appreciated by those skilled in the art that any modifications, or partial substitutions made within the scope of the present invention shall fall into the scope of the present invention defined by Claims attached. Therefore, the scope of present invention shall be defined by the claims.

What is claimed is:

1. A handover method applied in a communication network, comprising:
   receiving reserved cell indication information at a user equipment from a base station serving a reserved cell of a communication network, wherein the reserved cell indication information enables the user equipment to learn that the user equipment is located in the reserved cell, wherein the communication network comprises a first cell constituting a MBSFN area, a second cell not constituting the MBSFN area, and the reserved cell, wherein the reserved cell is between the first cell and the second cell and subordinate to the MBSFN area;
   measuring, in the reserved cell, a first signal strength based on a multi-cell transmission for a preset MBMS service associated with the MBSFN area and a second signal strength based on a single-cell transmission for the preset MBMS service associated with the reserved cell; and
   selecting the first cell or the second cell as a target cell during a period in which a difference between the first signal strength and the second signal strength is lower than a preset threshold.

2. The handover method according to claim 1, wherein the multi-cell transmission and the single-cell transmission are multiplexed on a same carrier.

3. The handover method according to claim 2, further comprising:
   selecting data of the multi-cell transmission and the single-cell transmission based on PDCH SN of PDCP for the preset MBMS service during a period in which the first and second signal strengths keep balanced.

4. The handover method according to claim 2, further comprises:
   initiating a RRC connection with the base station serving the reserved cell to establish the single-cell transmission for the preset MBMS service.

5. The handover method according to claim 1, wherein each of the multi-cell transmission and the single-cell transmission is on a respective carrier, and wherein the measuring comprises:
   measuring the first signal strength on a current carrier; and
   measuring the second signal strength on another carrier during a preset period.

6. The handover method according to claim 1, wherein the signal strength is the signal strength on a service channel.

7. The handover method according to claim 1, wherein the signal strength is the signal strength of a reference signal on a service channel.

8. The handover method according to claim 1, wherein one of the first cell and the second cell, which has higher signal strength, is selected as the target cell.

9. The handover method according to claim 1, wherein the reserved cell indication information is broadcast on a MCCH.

10. A user equipment configured to operate in a communication network that includes a first cell constituting a MBSFN area, a second cell not constituting the MBSFN area, and a reserved cell, wherein the reserved cell is between the first cell and the second cell and subordinate to the MBSFN area, the communication network including a base station configured to serve the served cell and broadcast reserved cell indication information, wherein the user equipment comprises:
    a transceiver configured to receive the reserved cell indication information wherein the reserved cell indication information enables the user equipment to learn the user equipment is located in the reserved cell;
    a measurement processor configured to measure, in the reserved cell, a first signal strength based on a multi-cell transmission for a preset MBMS service associated with the MBSFN area and a second signal strength based on a single-cell transmission for the preset MBMS service associated with the reserved cell; and
    a selection processor configured to select the first cell or the second cell as a target cell during a period in which a difference between the first signal strength and the second signal strength is lower than a preset threshold.

11. The user equipment according to claim 10, wherein the multi-cell transmission and the single-cell transmission are multiplexed on a same carrier.

12. The user equipment according to claim 11, further comprising:
    an extraction processor configured to select data of the multi-cell transmission and the single-cell transmission based on PDCH SN of PDCH for the preset MBMS service during a period in which the first and second signal strengths keep balanced.

13. The user equipment according to claim 11, wherein a RRC connection with the base station serving the reserved cell is initiated to establish the single-cell transmission for the preset MBMS service.

14. The user equipment according to claim 10, wherein each of the multi-cell transmission and the single-cell transmission is on a respective carrier, and wherein the measurement processor measures the first signal strength on a current carrier, and measures the second signal strength on another carrier during a preset period.

15. The user equipment according to claim 10, wherein the signal strength is the signal strength on a service channel.

16. The user equipment according to claim 10, wherein the signal strength is the signal strength of a reference signal on a service channel.

17. The user equipment according to claim 10, wherein one of the first cell and the second cell, which has higher signal strength, is selected as the target cell.

18. The user equipment according to claim 10, wherein the reserved cell indication information is broadcast on a MCCH.

19. A handover method applied in a communication network, wherein the communication network comprises a first cell constituting a MBSFN area, a second cell not constituting the MBSFN area, and a reserved cell between the first cell and the second cell being subordinate to the MBSFN area, wherein reserved cell indication information is broadcast in the reserved cell, the method comprising:
    receiving the reserved cell indication information to learn that a user equipment is located in the reserved cell;

measuring in the reserved cell, for a preset service, a first signal strength based on a multi-cell transmission and a second signal strength based on a single-cell transmission;

selecting the first cell or the second cell as a target cell during a period in which a difference between the first signal strength and the second signal strength is lower than a preset threshold; and selecting data of the multi-cell transmission and the single-cell transmission based on PDCH SN of PDCP for the preset service during a period in which the first and second signal strengths keep balanced.

20. The handover method according to claim 19, further comprising:

initiating an RRC connection with a base station serving the reserved cell to establish the single-cell transmission for the preset service.

* * * * *